United States Patent Office 3,035,912
Patented May 22, 1962

3,035,912
PROCESS OF RECORDING
Robert A. Le Massena and Richard S. Kampf, Denver, Colo., assignors to Minneapolis-Honeywell Regulator Company, Minneapolis, Minn., a corporation of Delaware
No Drawing. Filed Dec. 28, 1956, Ser. No. 631,078
2 Claims. (Cl. 96—27)

This invention relates to a process of recording photographically which process differs from practices known and heretofore used in the art. More specifically, this invention relates to a process for making records of the variations with time of a beam of radiant energy producing a trace or image on a film.

The recording process comprises one or more of the following three steps. The first or pre-exposure step comprises exposing the film for such a length of time to radiant energy of such intensity and spectral composition as to condition the film to produce a trace or image as rapidly as possible and/or without reversal consistent with requirements in regard to contrast or density between trace or image and background and recording speed. The second or exposure step comprises moving the film and/or moving a beam of radiant energy of high-intensity and of suitable spectral composition relative to each other in such a way that the location at which the beam strikes the film represents the instantaneous value or character of the phenomenon which modulates the beam. The beam produces a trace or image on the film. The modulation of the beam may be in respect to amplitude of deflection, intensity, width, frequency and character. The third or post-exposure step comprises exposing the film to radiant energy of such intensity and spectral composition that the trace or image produced on the film by the exposure step becomes immediately visible for all practical purposes without further processing and remains visible. When the first or pre-exposure step is omitted, the image or trace temporarily disappears upon post exposure, and subsequently reappears with an even greater contrast or density.

It is an object of this invention to produce on a film a trace or image which is immediately visible and which remains visible, which is of greater density, better contrast, without halation, and of greater permanence under normal room light and sunlight, than it is possible to produce without the use of the process of the present invention.

It is another object of this invention to produce a trace or image by the use of radiant energy having frequencies or wave lengths adjacent those of visible light and characterized by its higher energy content.

It is a further object of this invention to provide an improved recording process which may be employed to indicate immediately and permanently fluctuations in values or character of any physical, electrical, or chemical phenomena of either high or low frequency, regardless of whether the variations in frequency are recurrent or not.

It is a further object of this invention to record phenomenon under observation on a film by means of a trace or image which becomes immediately visible by a process consisting of the three following steps. The first or pre-exposure step comprises conditioning the film to reveal a trace which becomes immediately visible by exposing the film to low-intensity radiant energy of suitable spectral composition for a suitable time so that the radiant energy produces on the film a pale but visible fog composed of the most sensitive or largest particles of the emulsion. The second or exposure step comprises exposing the film to high-intensity radiant energy of suitable spectral composition which produces the trace or image. The third or post-exposure step, called "latensification," comprises exposing the film to medium-intensity radiant energy of suitable spectral composition for a suitable time to render the trace immediately visible by greater contrast to the background.

More specifically, it is an object of this invention to produce a trace or image by the use of radiaant energy having a wave length band which overlaps or encompasses the band of wavelengths to which the recording medium is responsive. Thus, in a preferred mode of this invention, the recording medium employed exhibits a substantial response over the band of wavelengths from 280 to 510 millimicrons and peaks at 410 millimicrons. The radiant energy source used in the exposure step substantially encompasses the wavelength band from 200 to 600 millimicrons and may include peaks depending upon the character of the lamp producing the radiation. That is to say, mercury peaks will be included when a high-pressure mercury-vapor lamp is employed. Other lamps producing radiation of substantial energy content over the stated band of wavelengths may be utilized.

In the preferred mode, the pre-exposure step is accomplished by exposing the recording medium uniformly to incandescent or fluorescent radiation including wavelengths in the band from 350 to 4000 millimicrons (peaking at about 1000 millimicrons) for a time sufficient properly to condition the recording medium as required to prevent reversal during the post-exposure step and to obtain the desired writing speed, resolution and contrast between trace or image and background. As described more fully hereinafter, we have discovered that a relationship exists between the intensity and spectral composition of the radiation and the time of pre-exposure and the contrast and permissible writing speed. Thus, with incandescent radiation, when the pre-exposure time is relatively long, for example, of the order of several hours, the permissible writing speed is highest and the best contrast is obtained. With shorter pre-exposure times of about one hour, the permissible writing speed is reduced with but a slight reduction in contrast. Pre-exposure with fluorescent radiation permits a substantial reduction in the pre-exposure time. The resulting permissible writing speeds and contrast, however, have been found to be lower than with incandescent radiation.

In the post-exposure step, referred to as latensification, the source of radiation employed may be the same as that used in making the exposure and produces radiation over the wavelength band from 200–600 millimicrons. Such a source is used for latensification when it is desired to accomplish this step in the process in the shortest time. Alternatively, the operation may be accomplished at a somewhat slower speed by a radiation source such as a fluorescent lamp which produces radiation over the wavelength band from 350 to 750 millimicrons. In this post-exposure step, it has been found that the recording medium exhibits a response over the band of wavelengths from 400 to 460 millimicrons.

A better understanding of the present invention may be had from the following detailed description.

*Film and Process of Sensitizing It*

The film used in this invention includes an emulsion which contains silver citrate and/or has an excess of silver nitrate, or may be a similar emulsion which is intended to produce a trace or image by the action of radiant energy alone. Among such films are those made and sold by Eastman Kodak Company and identified as its No. 1090 and those made and sold by Agfa, A.–G., Leverkusen, West Germany, and identified as Agfa Rec. L. These emulsions are adapted to receive a trace or image which becomes rapidly visible upon exposure to a suitable radiant energy source without the use of chemical solutions. This visible trace or image is produced rapidly provided that the exposure is above a certain minimum. Higher intensities produce a darker trace or image up to the limit of the emulsion. This image or trace, however, is not stable and fades upon exposure to room illumination. Higher intensities of illumination after exposure produce more rapid fading. Darker images fade more slowly than pale images.

It has been found that, if the emulsion receives a pre-exposure below that required to produce an immediately visible trace or image, a latent image is produced when the beam of radiant energy impinges upon it. This latent trace or image can be made visible by subsequent exposure to radiant energy of the proper spectral composition and intensity. The proper wavelength band is in the range from 400–460 millimicrons which appears to be the color of the image or trace. Higher intensities produce the image or trace more rapidly than low intensities.

The fisrt or pre-exposure step is predicated upon the known facts that certain silver-salts and other light-sensitive materials reveal an image when a proper quantity of light strikes them, that this image disappears upon subsequent exposure to light, and that upon further exposure, it is replaced by a much darker, stable image. The first step is used to prevent this disappearance of the image, which consumes time, thus hastening the appearance of the stable image. The term "pre-exposure" is applied to this process of decreasing the time required to produce a satisfactory trace or image subsequent to the exposure step and which is operative to prevent reversal in the trace or image. This step comprises exposing the film either to a constant, low-intensity radiant energy source of suitable spectral composition, as hereinbefore defined, for a given time, or to a variable-intensity radiant energy source of such suitable spectral composition for a shorter time. Suitable pre-exposure times are an exposure for 14 hours to a 100 watt incandescent lamp producing radiant energy wavelengths in the band from 350–4000 millimicrons, peaking at about 1000 millimicrons, with the film and lamp at 9 feet from each other or an exposure of ½ hour to a 40 watt incandescent lamp with the film and lamp at 1 foot from each other. This pre-exposure step produces a pale, visible fog composed of the most sensitive (largest) particles. It also "triggers" all of the medium-sensitivity (medium-size and largest quantity) particles and possibly some or all of the lowest-sensitivity (smallest) particles.

In the second alternative, the radiant energy may be varied in intensity from zero to a specified value, and increased in intensity at a rate which increases slowly at first but more rapidly thereafter. This rate of variation in intensity, when plotted against time, appears as an exponential curve. Such a suitable variable pre-exposure time is ½ hour to a 40 watt incandescent lamp at a distance of one foot with the energy to the lamp varied from a minimum to maximum.

The second or exposure step comprises exposure of the film to high-intensity radiant energy of an effective wavelength range to produce a latent trace or image. In a preferred mode, the wavelength band employed in this step includes the range from 200–600 millimicrons, upon which are superimposed mercury spectral lines when the radiant energy source is a so-called Osram lamp. The recording medium, hereinbefore described by way of example as being Eastman-Kodak #1090, exhibits response in the range from 280–510 millimicrons, with a peak at 410 millimicrons. Good results have been obtained also employing as the recording medium Agfa Rec. L. the sensitivity range of which is stated by the manufacturer, Agfa, A.-G., Leverkusen, West Germany, to be 280–480 millimicrons, with peak at 400 millimicrons. The radiant energy preferably is produced by a high-pressure mercury-vapour Osram lamp having an 0.012 inch diameter arc. An example of such a lamp is that manufactured by Hartman & Braun A.-G., Frankfurt am Main, West Germany, and idetified as their model HBO–107/1. This high-intensity radiant energy, which produces the trace or image, darkens and then fades all of the most sensitive particles but brings the medium-sensitivity particles only to the threshold of visibility. Due to the fog produced by the pre-exposure step, it is doubtful if the least-sensitive particles are affected by the exposure step, since these particles must receive radiant energy above a certain intensity in order to be changed.

The third or post-exposure step may consist of exposure to an Osram lamp for $\frac{1}{10}$ of a second at a distance of 12 inches between the film and the lamp. This post-exposure step immediately colors the particles which constitute the image or trace and carries them through the fading state quite rapidly. Also, in the trace or image areas, the fogged particles are colored more intensely and they contribute to the darkness of the image or trace.

Another and preferred example of the third or post-exposure step is to pass the film, which has just undergone the second or exposure step, close to a source of medium-intensity radiant energy. A suitable source of such medium-intensity is a 105–115 volt fluorescent lamp. A distance of from 2 to 6 inches is maintained between the lamp and the film. The time of this third or post-exposure step must be more than $\frac{1}{10}$ of a second.

As those skilled in the art will understand, the post-exposure step may be accomplished in a longer time by exposure to ordinary room-intensity fluorescent illumination, and in an even longer time by room-intensity incandescent illumination.

After the exposure to the Osram lamp or other source of medium-intensity radiant energy, which renders the image visible in a time of the order of $\frac{1}{10}$ of a second, the trace or image may be examined under 75 foot candles of fluorescent illumination or very intense incandescent illumination. Under such illumination, both the trace and the background continue to change. The trace becomes very dark rapidly, since its color transmits the most effective wavelength. The background changes very little, since all of the particles which could be affected were changed in the pre-exposure step at that intensity.

The effect produced by the pre-exposure or fogging step is to hold back the background, while the latent trace is accelerated by the second or exposure step by exposure to radiant energy of a greater intensity than that by which the background was fogged. Reversal is eliminated, since no visible trace is formed by the second or exposure step. No chemical processing of the film (which has undergone the three steps) is required since reversal has been eliminated and unprocessed traces are stable.

However, if desired, archival or relatively permanent stability may be obtained by chemical processing the film either before or after the third or post-exposure step. Suitable processes are: acid-hypo (fixer), thiourea (stabilizer), pyrocatechin-hypo (developer and fixer), or alkali-hypo (fixer).

An apparatus which may readily be adapted to carry out the process of this invention is disclosed in U.S. Patent 2,580,427, patented January 1, 1952, to Carl A. Heiland.

*Definitions*

The term "time-variations of phenomenon," as used in the specification and claims hereof, refers to phenomenon which may be studied and recorded with the use of the present invention. This term is to be construed broadly to include any phenomenon which may vary with time and is not limited to fluctuations which are continuous or regular in their manifestations.

The term "film" is to be construed as embracing any sensitized member capable of being used in the recording apparatus.

The terms "trace" or "image" are intended to define lines or areas which may be variable in amplitude, direction, density, width, or other character as distinguished from a spot.

The term "beam" is used to mean radiant energy concentrated in a plurality of rays travelling along straight lines in a narrowly defined path.

Summary

The process of the invention has the desirable advantages of producing a record in the form of a trace or image which is immediately visible within a very short time of the order of one tenth of a second after it has been made. This record will not fade upon subsequent illumination and may be made suitable for relatively permanent storage by subsequent chemical processing although this is not necessary normally. This record may be made at high speed because the beam of radiant energy is substantially without inertia, the parts which deflect this beam of radiant energy are small and have but little inertia, and the intensity of radiant energy employed is such as to produce the record substantially instantaneously. Writing speeds of many hundreds of inches per second with immediate visibility and without need for any subsequent chemical processing are possible because of the first or pre-exposure step in which the film is brought up to a threshold condition so that a trace is produced on the film in a minimum of time, without the previously experienced reversal. Such high writing speeds have not been obtainable with known types of recording apparatus. Moreover, significant increases in writing speed may be accomplished, permitting writing speeds of many thousands of inches per second, by subsequent and conventional chemical processing. When this is done, it is unnecessary to employ the pre-exposing step.

In some applications, the traces or images made may be observed under controlled conditions such as under the influence of a ruby lamp containing insignificant spectral components which affect the emulsion. It is, then, unnecessary to fix the traces or images as by the third post-exposure step of by chemical processing. The use of the pre-exposure step in such applications precludes reversal in the immediately visible traces or images produced in the subsequent exposure step.

What is claimed is:

1. A process of making a visible record as rapidly as possible and independently of wet processing on a film which will rapidly produce a visible image on being exposed to radiant energy, said film comprising, at least in part, an emulsion composed, at least in part, of particles of a silver salt, which process includes the following steps in sequence: uniformly pre-exposing for at least half an hour the entire recording surface of the film to low-intensity radiant energy of an intensity whose maximum is substantially equal to that of the light falling on a surface one foot from a forty watt incandescent lamp and having an effective wavelength within the range of from 350 to 4000 millimicrons with a peak at about 1000 millimicrons, producing thereby a pale, visible fog composed of the most sensitive, largest particles and triggering at least the medium sensitivity and medium size and largest quantity particles and at least some of the lowest sensitivity and smallest particles; exposing a portion of the recording surface of the so-treated film to a beam of radiant energy moving relatively to said film to form an immediately visible trace, said beam including effective wave lengths within the range from 280 to 510 millimicrons with a peak at about 420 millimicrons and of high intensity relative to said low intensity radiant energy, which high intensity radiant energy produces the trace, darkens and then fades all of the most sensitive particles within the trace and brings the medium sensitivity particles within the trace only to the threshold of visibility; and uniformly post-exposing for approximately $\frac{1}{10}$ of a second the entire surface of the film to radiant energy of medium intensity and including effective wave lengths within the range from 400 to 460 millimicrons, which medium intensity radiant energy immediately colors the particles forming the trace and carries them through the fading state quite rapidly and simultaneously colors the fog particles in the trace areas more intensely, said medium intensity radiant energy corresponding in intensity to that which would be produced at a distance of about 12 inches from a high pressure mercury vapor lamp having an 0.012 inch diameter arc.

2. A process of recording a phenomenon under observation on a light-sensitive-film having a light-sensitive emulsion thereon containing particles composed at least in part of silver salt, which process includes: conditioning the film by pre-exposing the entire recording surface of the film for from 14 hours to ½ hour to light from an incandescent lamp of from 100 watts to 40 watts at a distance between the film and the lamp of from 9 feet to 1 foot; thereafter exposing a portion of the recording surface of the film to a beam of radiant energy of high intensity relative to said light and including wave lengths of from 400 to 460 millimicrons with a peak at about 420 millimicrons, thereby producing an image on the film; and thereafter exposing the entire recording surface of the film to radiant energy of high intensity relative to said light and of low intensity relative to said beam and including wave lengths of from 400 to 460 millimicrons with a peak at about 420 millimicrons for not less than one tenth of a second at a distance of not more than twelve inches between the film and the lamp, thereby rendering the image on the film immediately visible.

References Cited in the file of this patent

UNITED STATES PATENTS

| | | |
|---|---|---|
| 1,840,351 | Douden | Jan. 12, 1932 |
| 1,857,089 | Sease | May 3, 1932 |
| 2,369,449 | Fallesen | Feb. 13, 1945 |
| 2,580,427 | Heiland | Jan. 1, 1952 |
| 2,912,327 | Maurer | Nov. 10, 1959 |

OTHER REFERENCES

Clerc: Photography—Theory and Practice, 2nd ed., Pittman (1937), pp. 346–357.

Photographische Industrie, 1925, pp. 163–164 and 982–985; 1934, pp. 843–844.

Photographische Korrespondenz, October 1930, pp. 256–260.